May 27, 1958 J. H. MacNEILL 2,836,809

CODED KEYBOARD

Filed Feb. 24, 1955 2 Sheets-Sheet 1

INVENTOR.
JOHN H. MAC NEILL

BY James S. Shannon
AGENT and
Wale Loouty
ATTORNEY

May 27, 1958 J. H. MacNEILL 2,836,809

CODED KEYBOARD

Filed Feb. 24, 1955 2 Sheets-Sheet 2

INVENTOR.
JOHN H. MAC NEILL

BY James S. Shannon
AGENT and
Wade Koontz
ATTORNEY

United States Patent Office 2,836,809
Patented May 27, 1958

2,836,809

CODED KEYBOARD

John H. MacNeill, Melbourne, Fla., assignor to the United States of America as represented by the Secretary of the Air Force Application February 24, 1955, Serial No. 490,442

2 Claims. (Cl. 340—365)

(Granted under Title 35, U. S. Code (1952), sec. 266)

The invention described herein may be manufactured and used by or for the United States Government for governmental purposes without payment to me of any royalty thereon.

The keyboard described herein is a device for producing an electrical parallel binary code representing the character or function indicated on the depressed key. The binary digits representing each coded character or function appear simultaneously in a plurality of output circuits each corresponding to one of the digits. In addition to the output circuits for code, a common output circuit which is closed each time a code is produced is also provided. The keyboard is interlocked so that only one key can be depressed at a time and so that one a key is depressed all keys are locked in their respective positions and the selected code is held in the code lines until a control signal is received signifying receipt of the code by the actuated mechanism. In this manner the duration of the produced code is controlled and the transmittal of another code before the receiving apparatus has assimilated the preceding code is prevented. Anti-repeat means are also provided for preventing the production of a code more than once for a single key depression.

The keyboard is designed for single-handed operation and is particularly useful in applications where a limited number of keys is required such as in data handling and processing systems. A few typical applications of the keyboard are as an auxiliary keyboard for single-handed operation of code operated writing machines to speed the preparation of manuscripts and paper tapes, as an input device for a separate tape punch, as a direct input unit to various types of data processing equipment, and as a manually operated coder for long distance communication.

The keyboard will be described in more detail in connection with the specific embodiment thereof shown in the accompanying drawings in which Figs. 1, 2, 3 and 4 are a plan view, a vertical section and two transverse sections, respectively, of the keyboard mechanism;

Figures 1, 2:
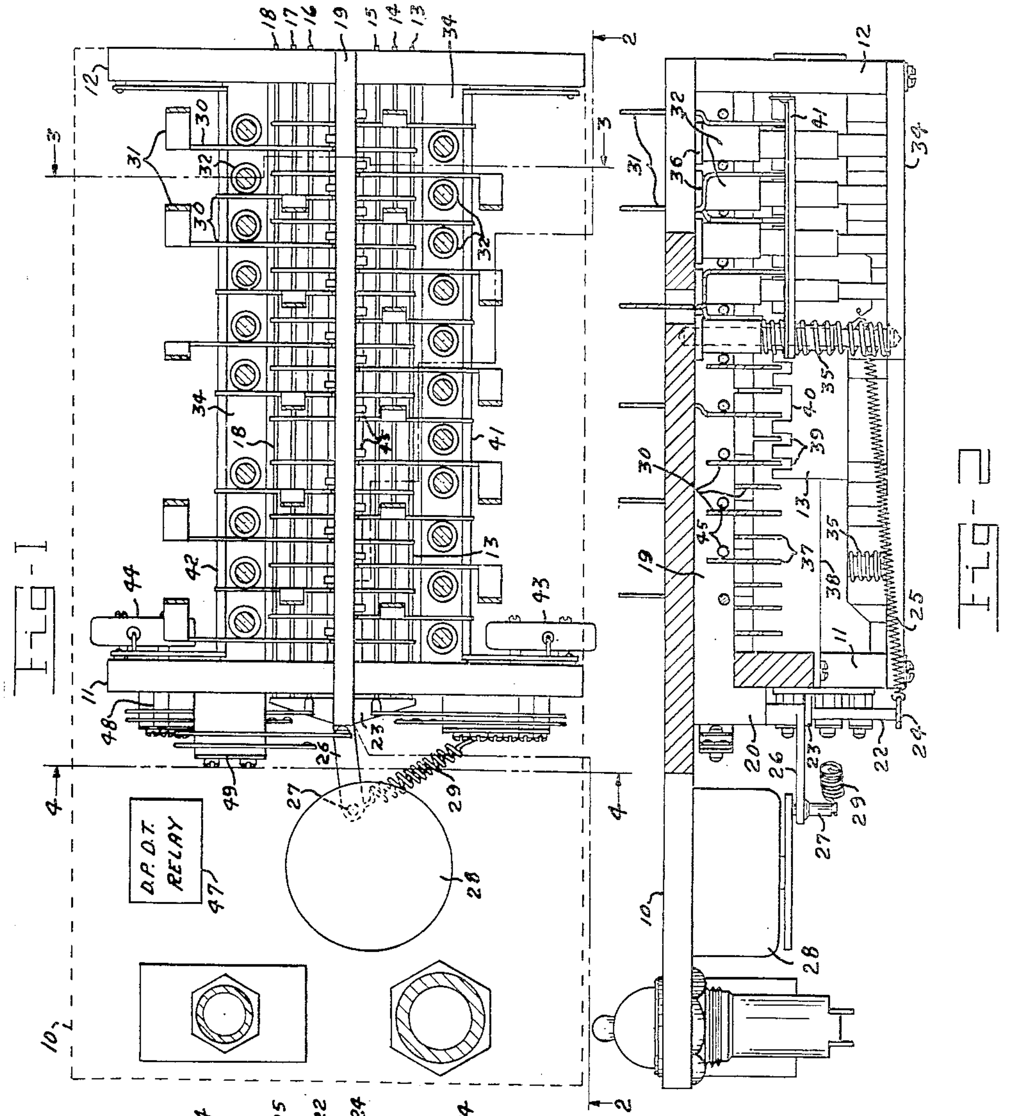
Figure 3:
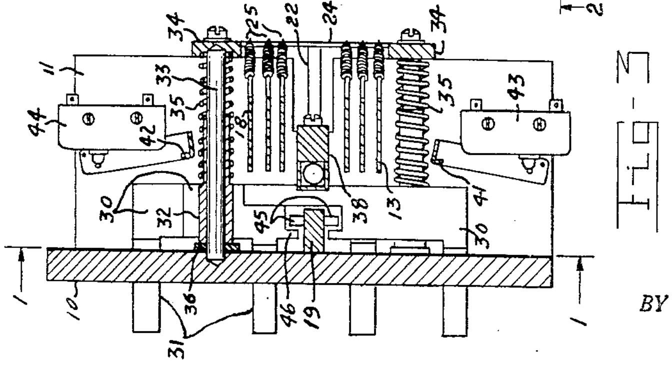

Referring to Figs. 1–4 the keyboard mechanism is mounted beneath and supported by a panel 10. The dotted outline only of this panel is shown in Fig. 1. The principal part of the mechanism is carried by end plates 11 and 12 attached to the under side of panel 10. The end plates are slotted to receive code bars 13, 14, 15, 16, 17 and 18 and to support these bars with sufficient freedom to permit them to slide in a direction normal to the end plates. The details of a code bar are shown in Fig. 5.

The end plates 11 and 12 are also slotted in their upper edges to receive and support locking bar 19 having an L-shaped end portion 20. This bar like the code bars is also free to slide in a direction normal to the end plates. The portion 20 of locking bar 19 carries a downwardly extending circular pin or post 22 which carries a code bar restoring bail 23 and a crossarm 24. Six springs 25 extend between crossarm 24 and code bars 13—18 and serve to constantly urge the code bars in the direction of the restoring bail 23. A connecting link 26 pivots about pin 22 between bail 23 and portion 20 of locking bar 19 and also about crank pin 27 of rotary solenoid 28. As seen in Fig. 1, locking bar 19 is normally held in its extreme right hand position, determined by the deenergized limit of solenoid 28, by the action of spring 29. Energization of solenoid 28 causes crank pin 27 to rotate in a counterclockwise direction, as seen in Fig. 1, moving locking bar 19 to its extreme left position which is determined by the energized limit of the solenoid.

The keyboard shown in the drawings has twenty-one keys and an equal number of transverse actuator bars 30 each having one of the keys attached thereto by a suitable upright extension 31. Each actuator bar is attached to a sleeve 32 which surrounds and is slidable over a pin 33 supported between panel 10 and a lower supporting strip 34. The actuator bars are constantly urged upward toward panel 10 by springs 35 which surround sleeves 32 and pins 33. Bumpers 36, made of plastic or other suitable material, surround pins 33 between sleeves 32 and the under side of panel 10. These bumpers are omitted in Fig. 1.

The actuator bars 30 also rest in slots 37 of a mechanical key interlock 38 of the ball race type which is supported by end plates 11 and 12. In addition to holding the actuator bars in transverse alignment the interlock prevents the depression of more than one key at a time. This is accomplished by providing a race length that exceeds the combined diameters of the balls by the thickness of only one actuator bar.

Figures 4, 5:
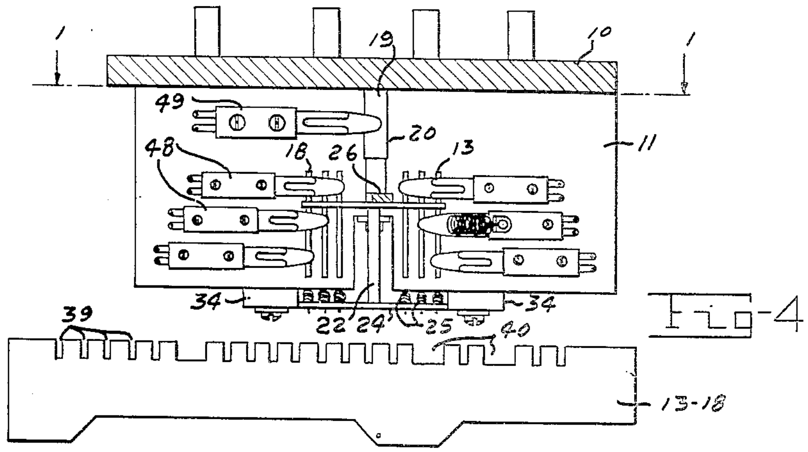
Fig. 5 shows the details of a code bar.

The code bars 13—18 are identical prior to coding. Referring to Fig. 5, the uncoded bar has a plurality of narrow slots 39 having the same spacing as the actuator bars 30. The bars are coded by removing the metal between adjacent narrow slots to produce wide slots 40. When the code bars are in their normal positions as shown in Fig. 2, the narrow slots are located directly beneath the actuator bars 30. Depression of a key moves its associated actuator bar downward into the aligned code bar slots beneath it. When the actuator nears the bottom of the code bar slots it engages either microswitch bail 41 or 42 forcing the bail downward and closing microswitch 43 or 44.

Actuation of either microswitch energizes rotary solenoid 28 which moves locking bar 19 to the left (Figs. 1 and 2). The solenoid geometry is so selected that energization of the solenoid brings locking studs 45 on bar 19 into vertical alignment with the actuator bars 30. In the case of the depressed key the associated stud is situated above actuator bar extension 46 (Fig. 3) and locks the key in its down position. For the remaining keys the studs 45 are beneath the actuator bar extensions 46 which locks the keys in their up positions. The locked depressed key continues to operate through the associated bail and microswitch to maintain energization of the solenoid with the result that the keyboard remains locked until the solenoid is deenergized through the action of anti-repeat relay 47 in a manner which will be explained later.

Locking bar 19 in moving to the left carries with it code bar restoring bail 23 and crossarm 24. When this occurs all code bars having the depressed actuator bar in a wide slot move to the left under the influence of springs 25. However, those code bars having the depressed actuator bar in a narrow slot are restrained by the actuator bar from such movement. As best seen in Figs. 1 and 4, each code bar has associated with it a code switch 48 which is actuated by the code bar when it is permitted to move in the above described manner. The six code output circuits are connected to these switches so that depression of a key results in the generation of a six-digit parallel binary code in the six output circuits, a closed circuit representing the binary digit 1 and an open circuit the binary digit 0. Switch 49 is actuated by locking bar 19 and is therefore closed each time a code is generated. This switch is adjusted to close after the code switches 48 have closed.

Figure 7:
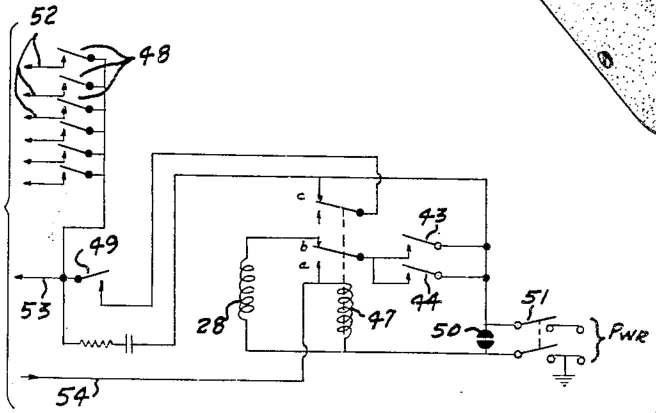
Fig. 7 is a wiring diagram of the keyboard.

The wiring diagram of the switchboard is shown in Fig. 7. Power is applied to the switchboard through power switch 51 and its presence is indicated by pilot light 50. Depression of a key causes either microswitch 43 or microswitch 44 to be closed energizing solenoid 28 through contacts *b* of antirepeat relay 47. In the manner already explained energization of solenoid 28 causes code switches 48 to be actuated in accordance with the code corresponding to the depressed key. Following actuation of the code switches common switch 49 is closed energizing common output line 53 and output code lines 52 through switches 48. The solenoid remains energized, the keyboard remains locked as explained above and the code remains in output lines 52 until a control signal is received from the driven apparatus over line 54. The control signal energizes antirepeat relay 47 opening the circuit to solenoid 28 at contacts *b*. Relay 47 holds at contacts *a* until microswitch 43 or 44 opens thus preventing a second production of the code should the control voltage release relay 47 prior to opening of the microswitch. The microswitch will not open until interlock bar 19 has returned to its rest position releasing the depressed key.

Figure 6:
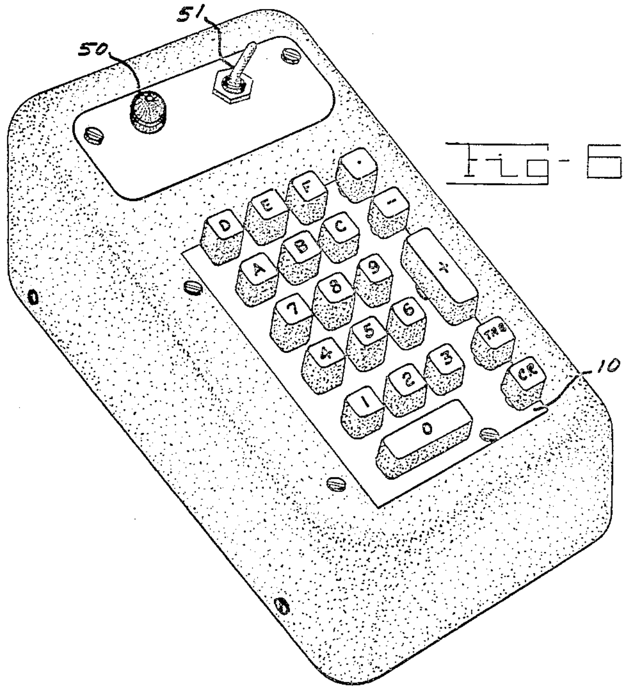
Fig. 6 shows the external appearance of the keyboard.

Fig. 6 shows the external appearance of a keyboard having the above described mechanism. This keyboard is particularly designed for the hexadecimal system of binary number notation and has the following coding:

| | | |
|---|---|---|
| 0—000000 | 7—000111 | E—001110 |
| 1—000001 | 8—001000 | F—001111 |
| 2—000010 | 9—001001 | .—010100 |
| 3—000011 | A—001010 | -—011000 |
| 4—000100 | B—001011 | +—010000 |
| 5—000101 | C—001100 | TAB—110001 |
| 6—000110 | D—001101 | CR—110101 |

While the specific example of the keyboard described has twenty-one keys and produces a six-digit code, the number of keys, the number of digits and the coding scheme may be varied as required without departing from the basic design of the keyboard.

I claim:

1. A coded keyboard comprising: a plurality of actuator bars each attached to one of the keys of said keyboard; a plurality of code bars; means supporting said code bars and providing for longitudinal movement of said bars between first and second positions; a plurality of slots in each of said code bars, each of said slots having one of two widths in accordance with a predetermined coding scheme, the narrower of said slots being only slightly greater than the thickness of said actuator bars and the wider of said slots exceeding in width the thickness of said actuator bars by an amount greater than the distance between the first and second positions of said code bars; means supporting said actuator bars transversely of said code bars and providing for movement of each of said bars manually through its associated key from a normal position in which said selector bar is wholly outside the slots of said code bars to a depressed position in which, with said code bars in their first positions, said actuator bar is inside one slot of each code bar; means associated with said code bars for constantly urging said bars toward their second positions; a two-position code bar restraining and actuator bar locking means operating in a first position to hold said code bars in their first positions and to free said actuator bars for movement to either of their first and second positions, and operating in a second position to free said code bars for movement to their second positions and to lock said actuator bars in either of their first and second positions; means constantly urging said restraining and locking means toward its first position; electrical means associated with said restraining and locking means and acting upon energization to move said restraining and locking means to its second position; first switching means actuated by any actuator bar in its depressed position for closing an electrical energizing circuit to said electrical means; and second switching means located in said energizing circuit and associated with said first switching means and operative when said first switching means is closed to break said energizing circuit and to hold said break until said first switching means opens.

2. Apparatus as claimed in claim 1 in which each code bar has associated therewith a code switch actuated in the second position of said code bar; in which a common switch is associated with said restraining and locking means and is actuated in the second position of said means; in which means are provided for applying voltage through said common switch to said code switches in parallel; and in which means associated with said second switching means is provided for interrupting the voltage applied to said common switch during the time said second switching means is in its operated state.

References Cited in the file of this patent

UNITED STATES PATENTS 2,083,160 Finch ---------------- June 8, 1937